US 7,656,831 B2

(12) United States Patent
Gao et al.

(10) Patent No.: US 7,656,831 B2
(45) Date of Patent: Feb. 2, 2010

(54) METHOD AND APPARATUS FOR POWER SAVING IN BEACON GENERATION OF WIRELESS NETWORKS IN AD HOC MODE

(75) Inventors: Xia Gao, Cupertino, CA (US); Fujio Watanabe, Union City, CA (US); Moo Ryong Jeong, Saratoga, CA (US)

(73) Assignee: NTT DoCoMo, Inc., Tokyo (JP)

( * ) Notice: Subject to any disclaimer, the term of this patent is extended or adjusted under 35 U.S.C. 154(b) by 187 days.

(21) Appl. No.: 11/454,259

(22) Filed: Jun. 16, 2006

(65) Prior Publication Data

US 2006/0285527 A1  Dec. 21, 2006

Related U.S. Application Data

(60) Provisional application No. 60/692,798, filed on Jun. 21, 2005.

(51) Int. Cl.
*G80C 17/00* (2006.01)
*H01Q 11/12* (2006.01)
*H04M 1/00* (2006.01)

(52) U.S. Cl. ............ 370/311; 455/127.5; 455/574

(58) Field of Classification Search ............ 370/311; 455/127.5, 574
See application file for complete search history.

(56) References Cited

U.S. PATENT DOCUMENTS

| | | | | |
|---|---|---|---|---|
| 5,109,484 | A * | 4/1992 | Hughes et al. | 709/222 |
| 2005/0037765 | A1 * | 2/2005 | Rajkotia et al. | 455/450 |
| 2005/0136914 | A1 * | 6/2005 | van Kampen et al. | 455/426.2 |
| 2005/0237984 | A1 * | 10/2005 | Benveniste | 370/338 |
| 2005/0272380 | A1 * | 12/2005 | Stacey | 455/70 |

FOREIGN PATENT DOCUMENTS

WO   WO2004/077718 A2   9/2004
WO   WO 2004077718 A2 *   9/2004

OTHER PUBLICATIONS

Part 11 "Wireless LAN Medium Access Control (MAC) and Physical Layer (PHY) Specification"; IEEE Std 802.11, Copyright 1999; pp. 513.
Part 11 "Wireless LAN Medium Access Control (MAC) and Physical Layer (PHY) Specifications"; IEEE Std 802.11 ma/D1.0, Copyright 2005; pp. 959.
International Search Report for International Application No. PCT/US06/24428, 2 pages.
Written Opinion for International Application No. PCT/US06/24428, 3 pages.

* cited by examiner

*Primary Examiner*—Ronald Abelson
(74) *Attorney, Agent, or Firm*—Haynes and Boone, LLP

(57) ABSTRACT

Methods for increasing power saving in a station that sends or receives frames in an ad hoc wireless network (e.g., IBSS), while allowing the station to enter a power-saving mode quickly upon completion of scheduled tasks. At the same time, a method of the present invention allows two stations in the ad hoc wireless network to infer each other's power management mode without requiring an ATIM/ACK exchange between the STAs within an ATIM window. Consequently, a station may enter a power-saving mode promptly without impairing the station's ability to receive packets. In one embodiment, a "more data" field is used between stations to exchange information. Stations with various computation abilities provide information under different time constraints. The stations may enter power-saving modes that send multicast/broadcast frames or use promiscuous mode within an ATIM window.

17 Claims, 12 Drawing Sheets

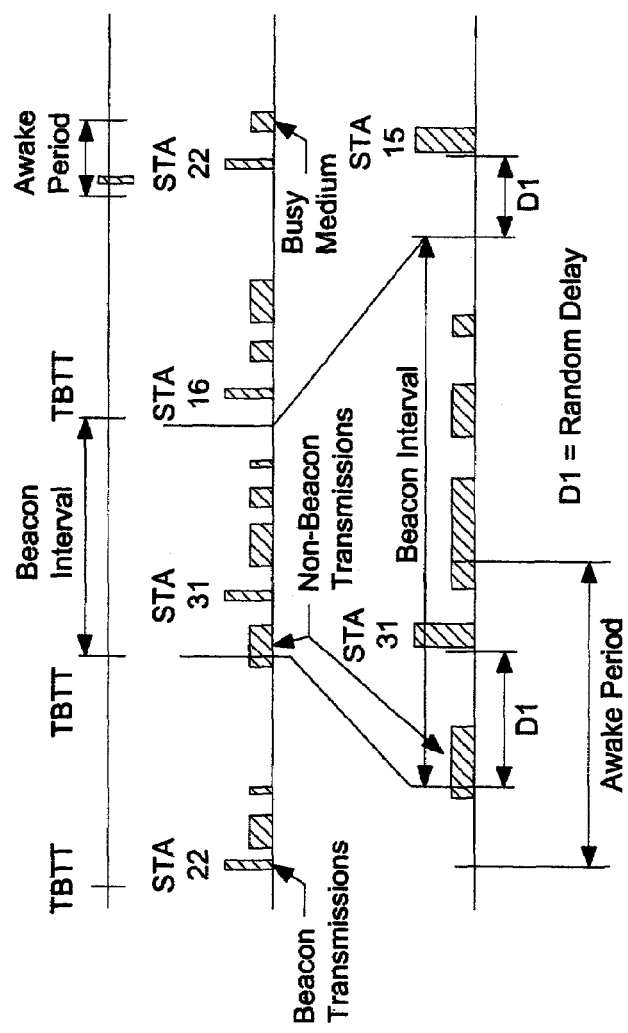

METHOD AND APPARATUS FOR POWER SAVING IN BEACON GENERATION OF WIRELESS NETWORKS IN AD HOC MODE

CROSS REFERENCE TO RELATED APPLICATIONS

The present application claims priority of U.S. provisional patent application No. 60/692,798, filed Jun. 21, 2005, incorporated herein by reference.

BACKGROUND OF THE INVENTION

1. Field of the Invention

The present invention relates to wireless computer networks; in particular, the present invention relates to power saving operations in an ad hoc wireless computer network.

2. Discussion of the Related Art

A wireless network allows a mobile user to maintain network access despite the mobile user's changes in location continuously or from time to time. By necessity, a mobile device operates from battery power and battery power is a scarce resource. Recently, improvements in battery lifetime for a mobile device have not kept up with improvements in computing power and communication capability. Hence, power efficiency is an important design parameter for a wireless computer network.

As compared to power management in an infrastructure network, power management in the link layer of an ad hoc wireless network (e.g., an ad hoc wireless network using the independent basic service set or "IBSS" under 802.11b) is not well understood and is not efficient. For example, in a wireless local area network (WLAN), the access point ("AP") has global knowledge of the power-saving states of all stations ("STAs") associated with it. In such a network, all communication with the mobile nodes go through the AP, so that the AP may buffer data packets designating STAs in a power-saving ("PS") mode. During pre-specified time intervals, the AP notifies these STAs to retrieve the buffered packets. In contrast, however, in an ad hoc wireless network, there is no entity in IBSS similar to AP that has global knowledge of power-saving states of all nodes. Instead, each STA stores packets locally and communicates individually with its peers to schedule packet delivery.

Due to the distributed nature of IBSS, many power-saving issues exist in IBSS under 802.11.

In WLANs operating under 802.11, the distributed coordination function ("DCF") uses a Carrier Sense Multiple Access with Collision Avoidance (CSMA/CA) protocol to determine—in a distributed manner—when a station operating within the wireless network is permitted to transmit and receive frames. Under CSMA/CA, prior to transmission, an STA senses the medium to determine if it is "busy" (i.e., if another STA is transmitting). If the medium is not busy, the STA may transmit. CSMA/CA requires a minimum specified separation in time, called the "interframe space" (IFS), between contiguous frame sequences. The transmitter waits the medium to become idle for at least IFS before transmitting. The value of IFS varies according to the priority of the transmitted frames. Examples of IFS values include: short IFS (SIFS), point IFS (PIFS) and distributed IFS (DIFS).

SIFS is the shortest interframe space and is used when a group of STAs have seized the medium for the duration of the frame exchange sequence to be performed. SIFS ensures completion of the frame exchange sequence before other STAs can access the medium, as the other STAs are required to wait for the medium to become idle for a time period longer than SIFS before attempting to transmit into the medium. Acknowledgment (ACK) frames, for example, use SIFS.

PIFS is used by STAs operating under the point coordination function (PCF) to gain priority access to the medium at the start of a contention-free period. PIFS is longer than SIFS, but shorter than DIFS.

DIFS is used by stations operating under the DCF to transmit data frames and management frames (e.g., probe request and probe responses).

Under DCF, if the medium is found busy, an STA defers transmission until after the current transmission completes. After a deferral, or prior to attempting to transmit again immediately after a successful transmission, a station selects a random "back-off" interval during which it does not transmit. A back-off interval counter keeps track of the interval.

Some example formats of control packets are provided in FIGS. 1 ("probe request frame"), 3 ("probe response frame"), and 4 ("acknowledge (ACK) frame"). A control packet has a format (i.e., "management frame") generically shown in FIG. 5. As shown in FIG. 5, the format includes a medium access control (MAC) header, a frame body and a frame check sequence (FCS). The FCS allows a determination on the integrity of a transmitted frame. In a 802.11 WLAN, an STA uses the destination address (DA) field in the MAC header of a packet to make receive decisions regarding the packet. For example, the DA field may contain a group address (e.g., a broadcast address) and, if the frame is not a beacon frame, the basic service set identifier (BSSID) must be validated (i.e., the BSSID field of the frame is the same BSSID of the recipient). (The BSSID field can be a broadcast BSSID in a probe request frame.) As another example, an STA, including an access point, may respond with an ACK frame within an SIFS deferral upon receiving a data frame or a management frame that does not specify a group address in the DA field. An ACK frames is not be transmitted for a packet specifying a group address in the DA field.

The state of the medium is determined from the physical and virtual carrier-sense functions. The physical layer provides a physical carrier-sense mechanism based on energy detection in the wireless medium. The MAC layer provides a virtual carrier-sense mechanism, referred to as the network allocation vector (NAV). The NAV predicts future traffic in the medium based on duration information that is announced in the frames prior to the actual exchange of data. With a few exceptions, such duration information is found in the MAC header.

A probe request frame is sent by an STA scanning an area for an existing network. A probe request frame invites the APs in the area to respond with probe response frames. As shown in FIG. 1, a probe request frame includes a service set identifier (SSID) field and the data rates supported by the STA. An AP receiving a probe request frame determines whether to invite the STA to join the network. As shown in FIG. 2, type bits (B2, B3) and subtype bits (B4-B7) of the frame control field identify both the frame type (e.g., "management") and the subtype (e.g., "probe request"). Table 1 shows the various possible values of the type and subtype bits.

TABLE 1

Example of valid type and subtype combinations

| Type Value B3 B2 | Type description | Subtype value B7 B6 B5 B4 | Subtype description |
|---|---|---|---|
| 00 | Management | 0100 | Probe request |
| 00 | Management | 0101 | Probe response |
| 00 | Management | 1000 | Beacon |
| 00 | Management | 1001 | ATIM |
| 00 | Management | 1101 | Action |
| 00 | Management | 1110-1111 | Reserved |
| 01 | Control | 1101 | Acknowledgement (ACK) |

To respond to a probe request frame, an AP sends a probe response frame (FIG. 3) to the scanning STA to inform the availability and the characteristics of the networks. Other frames include, for example, an ACK frame which acknowledges a received data frame, or a beacon frame (which announces the existence of a network).

Sending out beacon frames is an important part of many network maintenance tasks. Beacon frames are typically transmitted at regular intervals to allow mobile STAs to find, identify and match parameters of a network they may join. In a beacon frame, the frame body includes the following fields: (a) timestamp, (b) beacon interval, (c) capability, (d) SSID, (e) IBSS parameter set, and (f) traffic indication map (TIM). The information field within the IBSS parameter field contains an ATIM Window parameter. The IBSS parameter set format is shown in FIG. 14.

In an infrastructure network, APs are responsible for transmitting Beacon frames. The service area of an AP is defined by the reach of its beacon frames. Timing for the BSS is determined by the beacon interval specified in a beacon frame. The time interval between successive transmissions of beacon frames is called the "target beacon transition time" or TBTT.

In an IBSS network, beacon frames are generated in a distributed manner. The beacon interval is included in both beacon frames and probe response frames. The STAs adopt the beacon interval at the time each STA join the ad hoc network. In an IBSS network, all members participate in beacon generation. Each STA maintains a timing synchronization function (TSF) timer for beacon interval timing. As an IBSS network does not have access points, when an STA has buffered frames for a receiver that is in a low-power mode, the STA sends an announcement traffic indication message (ATIM) frame during the ATIM window to notify the recipient that it has buffered data for the recipient. The ATIM frame has a null frame body.

FIG. 15 shows the process of beacon frame generation in an IBSS. At each TBTT, each station (a) waits for the packet currently transmitting in the channel to complete, (b) suspends the back-off timer for any pending non-beacon or non-ATIM transmission, and (c) calculates a random delay that is uniformly distributed in the range between zero and $2*CW_{min}*TU$, where $CW_{min}$ is the size of the minimum contention window and TU is the timing unit. The STA then sets a timer using this random delay and wait for this timer to expire. If a beacon frame arrives before the random delay timer expires, the wait is canceled, and the backoff timer is resumed. However, if the random delay timer expires without the STA receiving a beacon frame, the STA sends out a beacon frame. ATIM messages are transmitted following the beacon frame from source stations to destination stations using the same distributed coordination function (DCF) algorithm as ordinary data packets. The length of the ATIM window is fixed and always starts from the theoretical TBTT time, whether or not there is packet transmission during the beacon interval.

The timestamp field in the beacon frame represents the value in the TSF timer at the frame's source. A station joining an IBSS network initializes its TSF timer to 0 and refrains from transmitting a beacon frame or a probe response frame until after it receives a beacon frame or a probe response frame from another member of the IBSS with a matching SSID to ensure proper synchronization within the IBSS network.

In an IBSS network, an STA may be in an "awake" state, in which the STA is fully powered, or in a "doze" state, in which the STA consumes little power and is unable to transmit or receive. The term "power management" for an STA refers to the manner in which an STA transits between awake and doze states.

In an infrastructure network, an STA changing its power management mode to a doze or PS state informs the AP using the power management bits within the frame control field of the transmitted frames. Thereafter, the AP does not arbitrarily transmit MAC service data units (MSDUs) to the STA. The MSDUs are buffered and transmitted at designated times. The STAs associated with an AP that has buffered MSDUs for the STAs are identified in a TIM that is included in all beacon frames generated by the AP. By interpreting the TIM, an STA is made aware that an MSDU is buffered for it. An STA operating in PS modes periodically listens for beacon frames, according to its listen interval and receive delivery traffic indication message (DTIM) parameters. Upon learning that an MSDU is currently buffered in the AP, the STA transmits a short PS-poll frame to the AP, which responds with the corresponding buffered MSDU immediately, or acknowledges the PS-Poll and responds with the corresponding MSDU at a later time. If an STA in its BSS is in PS mode, the AP buffers all broadcast and multicast MSDUs and delivers them to the STA immediately following the next beacon frame containing a DTIM transmission.

FIG. 16 shows the basic operations of power management in an IBSS. As shown in FIG. 16, after each TBTT, an ATIM window is defined. During the ATIM window, STAs operating in PS mode are awake to listen to beacon frames or ATIM frames. To transmit an MSDU to a recipient STA in a PS mode, the transmitting STA first transmits an ATIM frame during the ATIM window. ATIM transmissions from different STAs are randomized using the common DCF backoff procedure. Directed ATIMs are acknowledged. If a ACK frame is not received in response to a directed ATIM, the transmitting STA executes the back-off procedure to attempt a retransmission. Multicast ATIMs are not acknowledged. After the ATIM interval, the acknowledged MSDUs and the announced broadcast/multicast MSDUs are transmitted to STAs in the PS mode, using normal DCF access procedures. If an STA is unable to transmit a buffered MSDU during the beacon interval in which the MSDU is announced, the STA retains the buffered MSDU and announces it again in an ATIM during the next ATIM window. After all buffered MSDUs are transmitted, MSDUs are transmitted unannounced to STAs that are in the awake state.

An STA operating in PS mode enters the awake state prior to each TBTT. If the STA receives an ATIM management frame directed to it, or a multicast ATIM management frame during the ATIM Window, the STA remains in the awake state until the end of the next ATIM window. An STA that has transmitted a beacon frame or an ATIM management frame will remain in the awake state until the end of the next ATIM window, regardless of whether or not an acknowledgement is received for the ATIM. If the STA has not transmitted an ATIM and does not receive either an ATIM management frame directed to it, or a multicast ATIM management frame during the ATIM window, the STA may return to the Doze state following the end of the current ATIM window.

Beacon generation and power management are related activities. Beacon frames are transmitted during the awake periods of STAs operating in PS mode, such that all STAs may process the beacon frames. Furthermore, the source of a beacon frame does not enter the PS state until the end of the next active period, so as to ensure that at least one STA is awake to respond to probe request frames from new STAs scanning for a network.

Thus, the current standard requires that an STA transmitting a beacon frame in an IBSS network to remain awake until the end of the next ATIM window to ensure that any probe request sent by an STA scanning for a network is answered. The STA is kept awake regardless of whether or not the STA has packets to send or receive. Significant power is therefore dissipated by the STA. By keeping STAs sending ATIM/ACK awaken within the entire beacon interval, the standard enables an STA to derive the power management states of other STAs even without direct ATIM/ACK exchanges. For example, upon receiving a multicast/broadcast frame, the receiver infers that the sender is awake throughout the entire beacon interval. A receiver of a unicast ATIM frame can make the same inference, even though, in the event that the ACK frame is lost, the sender may not infer the power management state of the receiver. With this extra information, an STA can send frames to those STAs that it infers to be in an awake mode.

There is, therefore, a need for improved power-savings in active stations by allowing the active stations to enter a doze mode promptly after finishing packet transmission and reception, while maintaining the ability by STAs to make inference of the power management states of other STAs and ensuring that an STA entering a doze mode does not impair ommunications between the STA and its neighbors.

SUMMARY

The present invention provides methods for increasing power saving in an STA that sends or receives frames in an ad hoc wireless network (e.g., IBSS), while allowing the STA to enter a power-saving mode quickly upon completion of scheduled tasks. At the same time, a method of the present invention allows two STAs to infer each other's power management mode without requiring an ATIM/ACK exchange between the STAs within an ATIM window. Consequently, according to the present invention, an STA may enter a power-saving mode promptly without impairing the STA's ability to receive packets.

According to one embodiment of the present invention, a "more data" field is used between STAs to exchange information regarding future data transmissions. According to various embodiments of the present invention, STAs with different computational abilities provide information under different time constraints. STAs may enter power-saving modes that send multicast/broadcast frames or use promiscuous mode within an ATIM window.

The present invention is better understood upon consideration of the detailed description below in conjunction with the accompanying drawings.

BRIEF DESCRIPTION OF THE DRAWINGS

FIG. 14 shows fields in the IBSS parameter set of a beacon frame.

FIG. 15 shows the process of beacon frame generation in an IBSS.

DETAILED DESCRIPTION OF THE PREFERRED EMBODIMENTS

Figure 1:
FIG. 1 shows the format for a probe request frame.
Figure 2:
FIG. 2 shows data fields within a frame control field of a frame.
Figure 3:
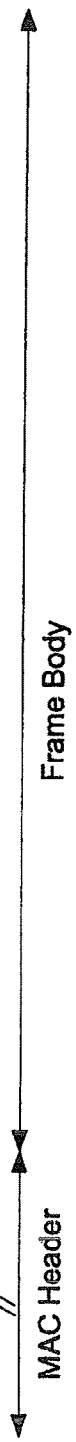
FIG. 3 shows the format for a probe response frame.
Figure 4:
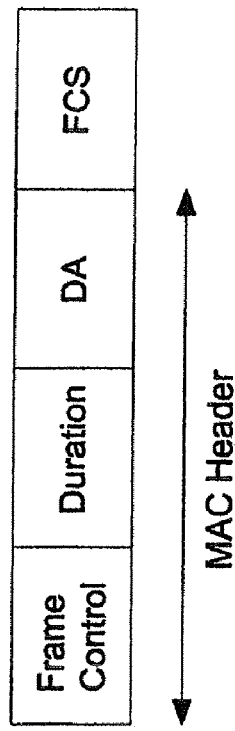
FIG. 4 shows the format for an acknowledge (ACK) frame.
Figure 5:
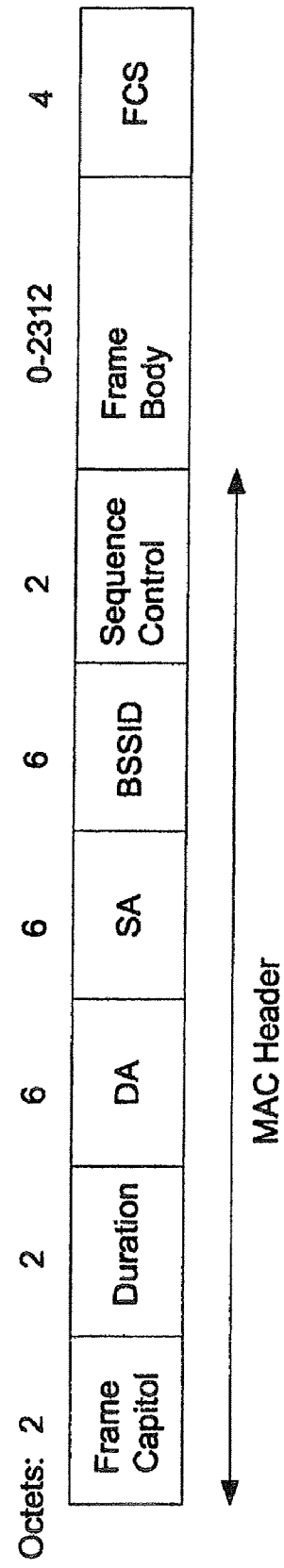
FIG. 5 shows the generic format for a management frame.

The present invention provides algorithms that optimize power-savings for active STAs (i.e., those wireless STAs sending or receiving messages) in an ad hoc wireless network.

In one embodiment of the present invention, STAs of an ad hoc wireless network send or receive only unicast ATIM messages within the ATIM window and do not operate in a promiscuous mode (i.e., in conformance with the practice under 802.11 standards). Under 802.11, based on an exchange of an ATIM frame and an ACK frame, the sender and receiver STAs may infer different internal states about each other:

TABLE 2

Sender and Receiver Internal States

| Case # | Sender | Receiver | Implication |
|---|---|---|---|
| 1 | Sends an ATIM frame correctly and receives an ACK frame correctly | Receives an ATIM frame correctly and sends an ACK frame correctly | The Sender and the Receiver believe that they are in the same power state, and therefore consider each other as peers. |
| 2 | Sends an ATIM frame correctly, but fails to receive the corresponding ACK frame, | Receives an ATIM frame correctly and Sends the corresponding ACK frame correctly | The Receiver treats the Sender as its peer, but the Sender does not treat the Receiver as its peer. |

TABLE 2-continued

Sender and Receiver Internal States

| Case # | Sender | Receiver | Implication |
|---|---|---|---|
| 3 | Sends an ATIM frame correctly, but fails to receive the corresponding ACK frame. | Fails to receiver an ATIM frame, and thus does not send a corresponding ACK frame. | Neither the Receiver nor the Sender treats the other as its peer. |

An STA sends a data frame to a recipient STA upon the expiration of an ATIM window only if an ATIM frame from the STA is correctly acknowledged by the receiver STA within the ATIM window. If the sender STA of the data frame has one or more additional data frames to be sent to the receiver STA after the current data frame, the sender STA sets the "more data" field of the current data frame to '1'. Otherwise, the sender sets the "more data" field to '0', thereby informing the receiver that the current data frame is the final frame from the sender STA. Within a beacon interval, if a STA only receives data frames, upon receiving the final data frame from each sender STA (i.e., after receiving from each expected sender a data frame with the "More Data" field set to '0'), the STA may enter a power-saving state or doze mode. This scheme works properly for cases 1 and 3 of Table 2 above. However, under case 2 of Table 2, the sender—not having received an ACK frame to the ATIM frame from the receiver STA during the ATIM window—would not send a data frame to the receiver STA, while the receiver STA expects to receive the data frame. As a result, the receiver STA waits in vain for the expected data frame and does not enter the doze mode.

In this embodiment, the sender STA uses information other than the ATIM/ACK exchange to infer that the receiver STA is in an awake state or active mode, and sends out the data frame to the receiver STA. Some examples of information that allows the sender STA to infer the receiver STA's power saving mode include: a) the receiver STA is the sender of some multicast or broadcast frames, or b) the receiver STA is also expected to send a data frame to the sender STA.

Alternatively, in addition to sending data frames to STAs from which acknowledgement to ATIM frames were correctly received, the sender STA may send data frames to STAs that did not correctly acknowledge ATIM frames (i.e., both cases 2 and 3 of Table 2). Under this scheme, the receiver STA acknowledges the data frame when the data frame is correctly received. Otherwise—i.e., if the data frame is not correctly received at the receiver STA, or if the receiver STA is in a doze mode when the data frame is sent—after the sender has waited for a time-out period and not receiving a corresponding ACK frame to the data frame, the sender STA concludes that the receiver STA is in a power-saving state and removes the receiver STA from its peer list. Alternatively, if the data to be sent is lengthy, the sender STA may use the Request to send/Clear to Send (RTS/CTS) mechanism first to establish that the receiver STA is awake before sending the data frame.

Figure 6:
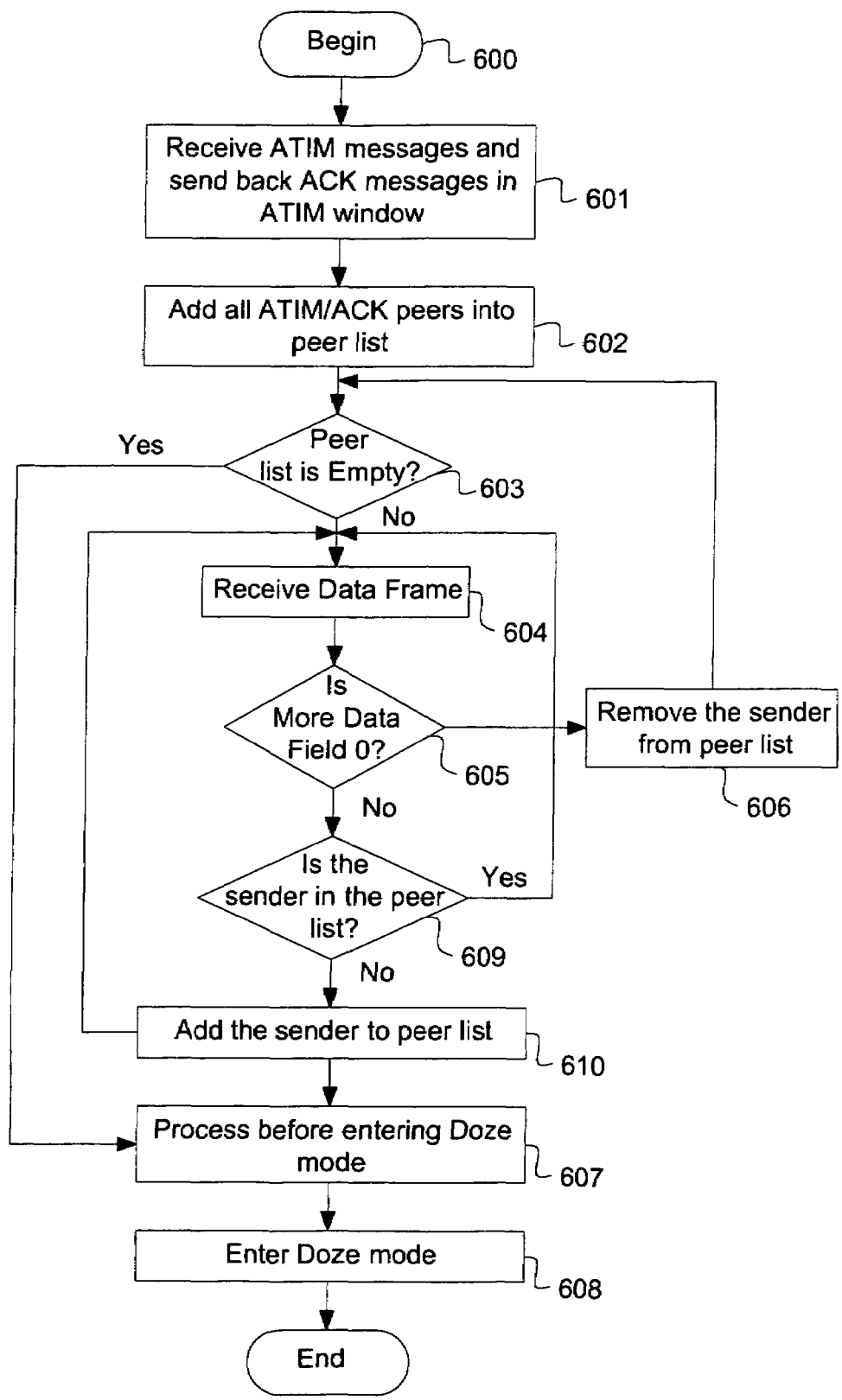
FIG. 6 illustrates the operation of a receiving STA, in accordance with one embodiment of the present invention.

FIG. 6 illustrates the operation of a receiving STA. As shown in FIG. 6, an STA maintains a peer list by recording sender STAs from which the STA receives an ATIM frame during the ATIM window (steps 601, 602). As data frames are received (step 604), a sender STA is removed from the peer list when a data frame is received from the sender STA with the "more data" field set to '0' (steps 605, 606). As described above, the sender STA may send a data frame corresponding to a previous ATIM frame that it did not receive an acknowledgement. Therefore, when the receiver STA receives a data frame from a sender STA not on its peer list (step 609), representing a possible missed ATIM frame, the receiver STA adds the sender to the peer list (step 610). Normally, when the peer list becomes empty, the receiver STA enters a doze mode (step 608). Although not required, before entering the doze mode, however, the receiver STA may send out a multicast null data frame to inform its neighbors about the impending power management transition (step 607).

Figure 7:
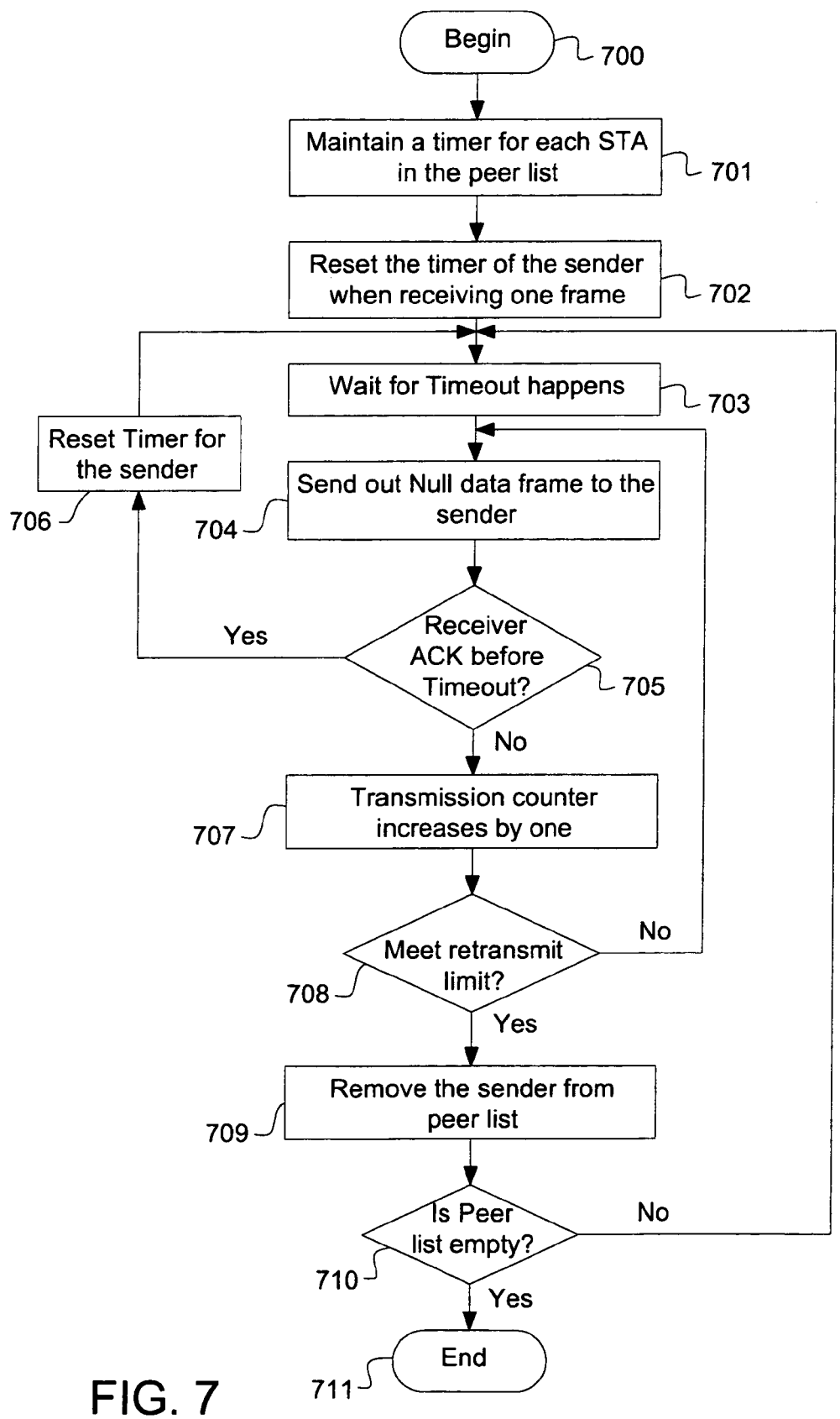
FIG. 7 shows one method by which the receiver STA may avoid waiting for a sender STA who did not receive an ACK frame to an ATIM frame, in accordance with one embodiment of the present invention.

Still alternatively, a receiver STA may send a unicast null data frame to a sender STA with the power management field in the header set to '1', after observing that the channel has been idle over a period of time, even though the receiver STA expects a data frame from the sender STA by reason of the previous ATIM frame. FIG. 7 shows one method by which the receiver STA may avoid waiting for a sender STA which did not receive an ACK frame to an ATIM frame. As shown in FIG. 7, the receiver STA maintains a timer for each sender STA on its peer list (step 701). As a data frame is received from a sender STA, the receiver STA resets the timer for that sender STA (step 702). When a timer for a sender STA expires after a predetermined time period (i.e., the timer "times out", step 703), the receiver STA sends out the unicast null data frame (step 703). When the ACK frame corresponding to the null data frame arrives, the timer is reset (step 706). If the null data frame is not acknowledged after a predetermined time interval (step 705), the receiver STA may resend the null data frame after a back-off interval for up to a predetermined retransmission limit (stepa 707, 708). When the predetermined retransmission limit is reached (step 709), the receiver STA regards the sender STA as being in a doze mode and accordingly removes the sender from its peer list (step 710).

As described above, a sender STA may enter a doze mode after sending all outstanding data frames to its receivers, and by setting the "more data" field to '0' in its final data frame to each receiver during the current beacon interval, thereby notifying the end of its transmission to the receiver. However, this description has not taken in to consideration that a sender STA may itself be a receiver. For example, under the current 802.11 standard, an STA may transmit a data frame without announcement to another STA that is known to be in the awake state for the current beacon interval (e.g., from transmitting an appropriate ATIM management frame). Hence, even though a sender STA has not received an ATIM frame from one of its receiver STAs, the receiver STA may still send data frames to the sender STA. So ideally, after finishing sending out data frames, a sender STA should ascertain that there are not data frames to be sent from its receivers before entering a doze state. This embodiment provides, as examples, three methods for a sender STA to ascertain incoming data frames.

Upon receiving the final data frame from a sender STA with the "more data" field set to '0' and when a receiver STA has data for the sender STA, a receiver STA sends back an ACK frame in which the receiver STA sets the "more data" field to '1'. Otherwise, the receiver STA sets the "more data" field of the ACK frame to '0'. The sender STA thereby learns the state of its receivers. When no data is expected from any of its receivers, the sender STA may enter a doze mode. Under this arrangement, the receiver STA sends out an ACK frame within the SIFS time after receiving a data frame from a sender STA. One drawback of this method is that, in many implementations, the receiver STA may not have enough computation capabilities to be able to determine whether or not it has data to send to the sender and accordingly correctly sets the "more data" field.

Alternatively, to allow more time to finish interval processing and to set up the "more data" field correctly, the receiver STA may send out the ACK frame after PIFS time. (PIFS time is the sum of SIFS and a slot time.) Because all other stations wait for at least DIFS time after the data frame is completed to access the channel, the receiver STA may still send out the ACK frame without risking collision, and thus this method extends the processing time by one slot time. Upon receiving this delayed ACK frame, if a sender STA has already timed out (i.e., assumed that the data frame did not properly reach the receiver) and has entered a back-off procedure to resend the data frame, the sender STA considers the previous data frame successfully transmitted and cancels the back-off procedure.

Figure 9:
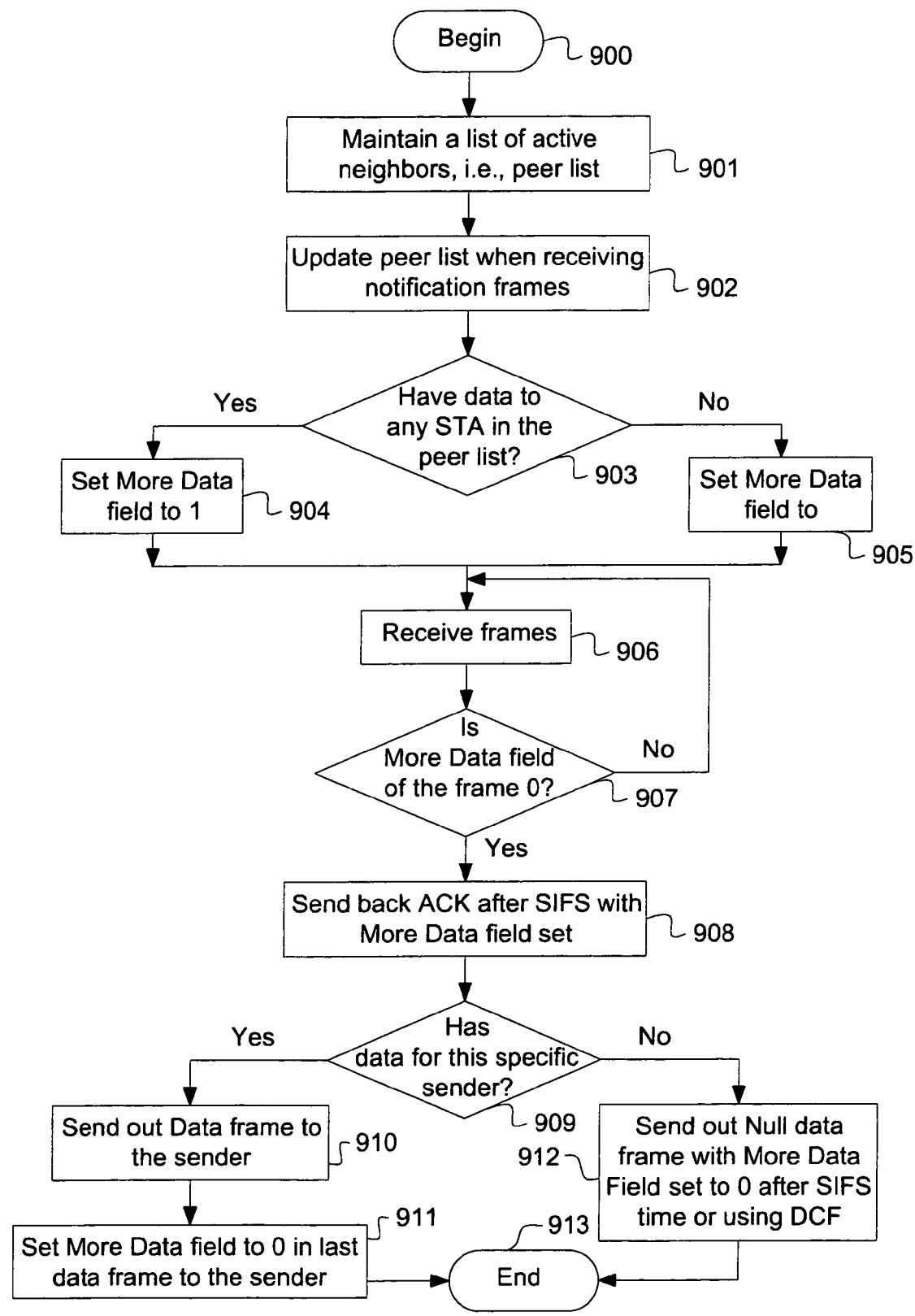
FIG. 9 shows another method for a receiver STA to send a notification message to a sender STA, in accordance with one embodiment of the present invention.

Still alternatively, the receiver STA sends the ACK frame within the conventional response time (i.e., within an SIFS time). However, if the receiver STA has outgoing data to any sender STA, the receiver STA sets the "more data" field to '1' to indicate that the receiver STA is sending one or more data frames within the beacon interval. Otherwise, the "more data" field is set to '0'. In this manner, the receiver STA notifies all sender STAs its awake state globally. FIG. 9 shows one instance in which such a method for a receiver to send a notification message to a sender. As shown in FIG. 9, a receiver maintains a list of active peers (step 901). When a message is received from a new sender STA, the new sender STA is added to the list, and when a peer notifies that it is entering a doze mode, the peer is removed from the list (step 902). If the receiver STA has any data to send to any STA in the peer list, the receiver STA sets the "more data" field to '1' in the control and data frames it sends out (step 904). Otherwise, the receiver STA sets the "more data" field in outbound control or data messages to '0' (step 905). When receiving a data frame (step 906), if the "more data" field is not set to '0' (step 907), the receiver STA does not take any power-saving action, as it expects one or more additional data frames from the sender STA. However, if the data frame received has the "more data" field set to '0', the receiver STA sends an ACK frame after SIFS time with the "more data" field set according to rules mentioned above (step 908). As this processing does not involve looking up the data to be sent to a particular sender STA, this information may be pre-processed, so that the value for the "more data" field may be established within the SIFS time constraint.

At the same time, the receiver STA may use the resources to prepare sender-specific actions. If the receiver STA has no data for a specific sender STA after transmissions from the specific sender STA is completed, the receiver STA can send a unicast null data frame to the sender STA after SIFS time or using distributed coordination function (DCF) procedure (step 912). The "more data" field of this null data field is set to '0' to indicate that no further transmission is planned for the specific sender (step 912). Note that, if there is data for any sender STA, the "more data" field in the previous ACK frame was set to '1'. For this specific sender STA, the receiver STA sends one or more data frames (step 910) and, at the final one of these data frames, set the "more data" field to '0' (step 911). In this manner, the receiver STA prepares data frames to specific sender STAs it has data and uses the "more data" field in the data frame to communicate with the specific sender STAs.

Figure 8:
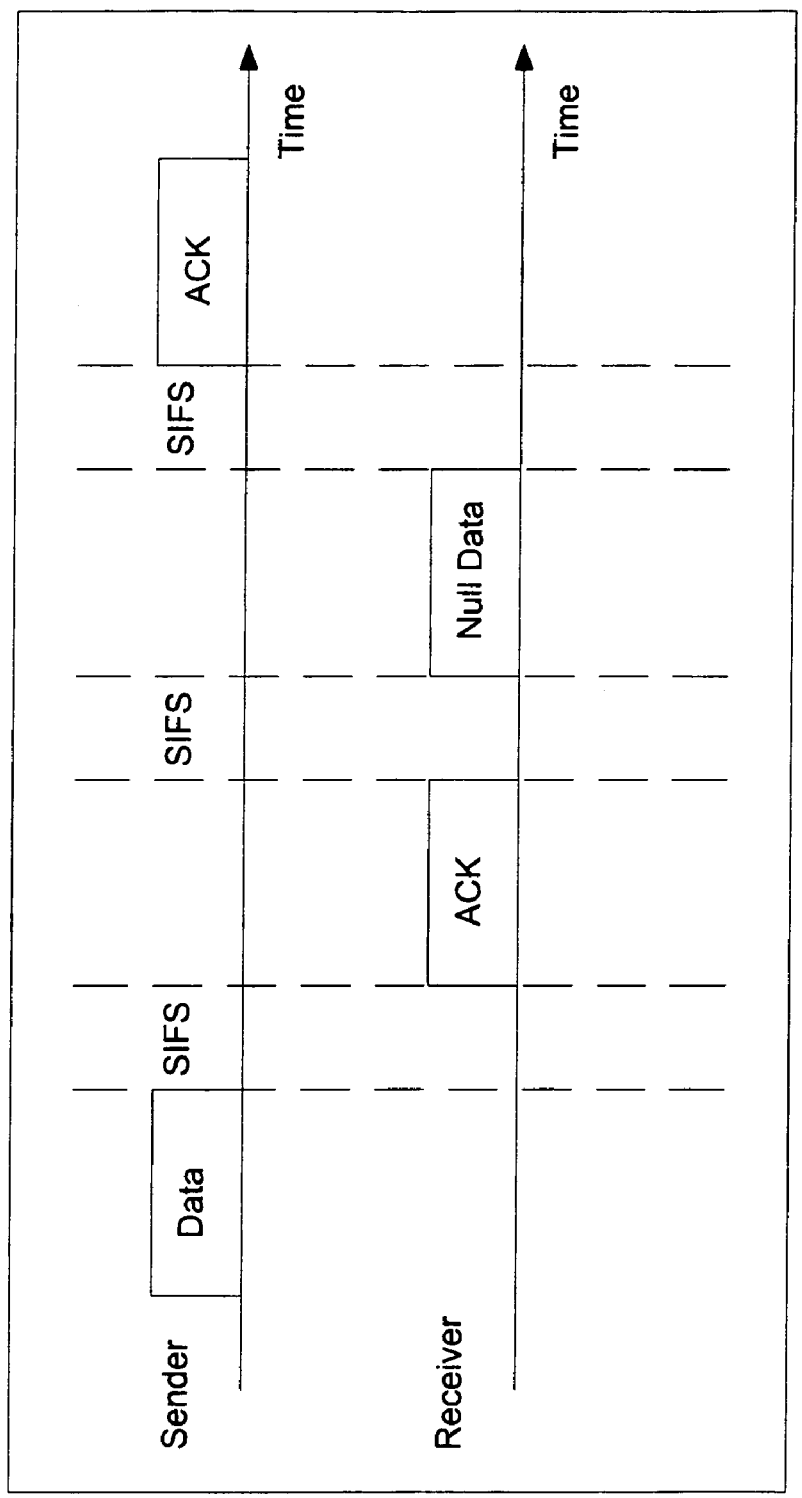
FIG. 8 illustrates protocol transactions by which a receiver STA notifies a sender STA that it has data to send, in accordance with one embodiment of the present invention.

The null data frame (step 912) may be sent out one or more ways. For example, the null data frame may immediate follow the ACK frame within SIFS time to avoid contention. The sender STA may send an ACK frame to acknowledge the nult data frame. The receiver STA can resend the null data frame if the expected ACK frame is not received (i.e., "timed out"). The protocol transactions are shown in FIG. 8. The network allocation vector (NAV) of the ACK frame is enlarged by the sum of SIFS and the time to transmit the new null data frame. The receiver STA may also send the null data frame using ordinary DCF.

Figure 10:
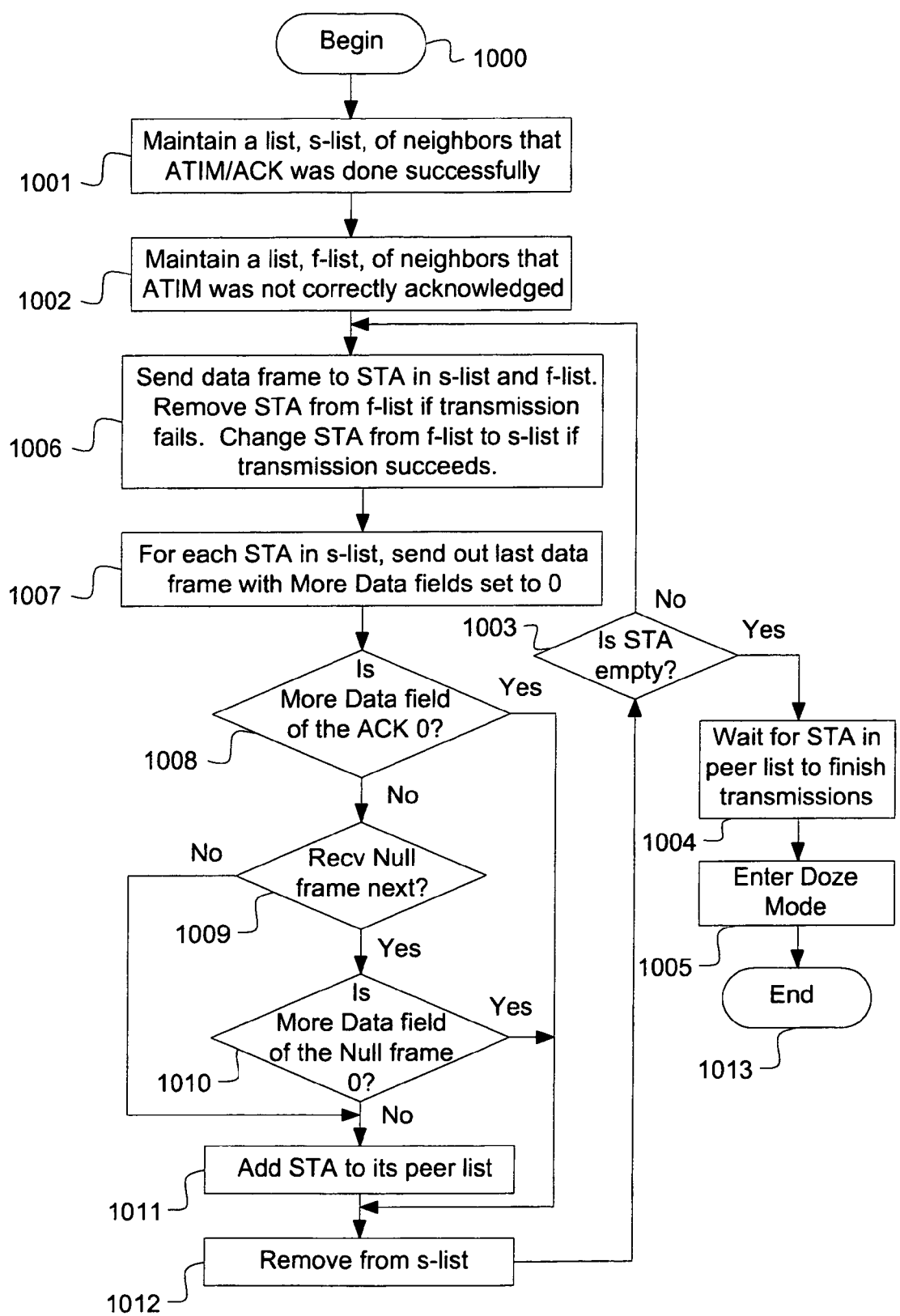
FIG. 10 shows the sender STA's process to determine when to enter a doze mode, in response to the receiver's process described above in conjunction with FIG. 9.

FIG. 10 shows the sender STA's process to determine when to enter a doze mode, in response to the receiver STA's process described above in conjunction with FIG. 9. In this embodiment, the sender STA keeps two lists: the s-list and the f-list. The s-list includes all STAs that the sender receives an ACK frame in response to its ATIM frame during the ATIM window (step 1001). Correspondingly, the f-list includes all STAs from which no ACK frame was received during the ATIM window (step 1002). After the ATIM exchange period, the sender STA sends data frames to STAs both in the s-list and f-list (step 1006). If a data frame transmission to an STA on the f-list fails, the corresponding STA is removed from the f-list. However, if an ACK frame is received from an STA on the f-list, the STA is transferred from the f-list to the s-list. Thus, at some point in time during the beacon interval, the f-list becomes empty.

The sender STA sends data frames to the STAs in the f-list and s-list with the "more data" fields properly set. In this embodiment, the sender STA retransmits a data frame if a corresponding ACK frame is not received within an expected time. Further, in the last data frame to an STA, the sender STA sets the "more data" field to '0' (step 1007). Then, the sender STA waits for notification from the receiver STA as to whether the receiver STA has data for the sender. As described above, the "more data" field in the ACK frame returned from the receiver STA in response to the sender STA's last data frame is set to '0' only when the receiver STA has no data for any of its neighbors (step 1008). At that point, the receiver STA is removed from the sender's s-list (step 1012). However, if the "more data" field in the ACK frame is set to '1', the sender STA expects to receive more specific information from the receiver STA in subsequent frames. If the next frame from the receiver STA is a null data frame and the "more data" field is set to '0' (step 1010, corresponding to step 912 of FIG. 9), there is no more data from the receiver STA to the sender STA. At that point, the receiver STA may be removed from the s-list. Otherwise, the sender STA expects additional data frames from the receiver STA. After these processing, the receiver STA is removed from the s-list. If the sender STA expects data frames from the receiver STA, the sender adds the receiver STA to its peer list (step 1012). The peer list includes all STAs that the sender STA expects data frames. The sender STA waits for all the STAs in the peer list to complete their transmissions to the sender STA (steps 1003, 1004). When the transmissions are complete, the sender STA goes into a doze mode.

In the general case, an STA is both a sender and a receiver within a beacon interval. In that case, the STA follows the sender STA's process to sends out data packets and the receiver STA's process when it receives data frames. The STA only enters a doze mode when it finishes all its transmissions and receptions. In the case when two peers send to ATIM frames to each other during the ATIM window, or send data frames to each other subsequent to the ATIM window, both STAs consider the other as peers and their states can be communicated through the "more data" fields in their respective outgoing data frames. Therefore, upon receiving a data frame, the receiving STA may omit the unicast null data frame to signal completion of transmission to the other STA (i.e., step 912 of FIG. 9). Thus, the processes of FIGS. 9 and 10 also govern when two STAs are both senders and receivers to each other.

According to a second embodiment of the present invention, STAs may send multicast or broadcast messages. In this embodiment, no STA operates in the promiscuous mode. Under existing 802.11 wireless networks, an STA sending out a multicast or broadcast frame is awake throughout the beacon interval. Because the multicast or broadcast frame is received by a number of STAs, the receiver STAs derive the sender STA's awake state. As a result, data frames may be sent to an STA that sends out a multicast or broadcast frame without announcement using ATIM frames.

For a sender STA of a multicast or broadcast frame, there are many choices as to when to enter a doze mode. In one approach, the sender STA may enter a doze mode immediately after finishing its transmissions. The sender STA may complete its multicast or broadcast transmission as specified in the existing 802.11 standard. Under this approach, unless an ATIM frame is received during the ATIM window, the sender STA does not wait for possible transmissions from the multicast or broadcast receivers. For its unicast transmissions, the STA follows the same process as described above with respect to FIGS. 6-10. Upon completion of the unicast and multicast communications, the STA enters a doze mode. In that case, there is no special provisions for multicast or broadcast transmissions.

Figure 12:
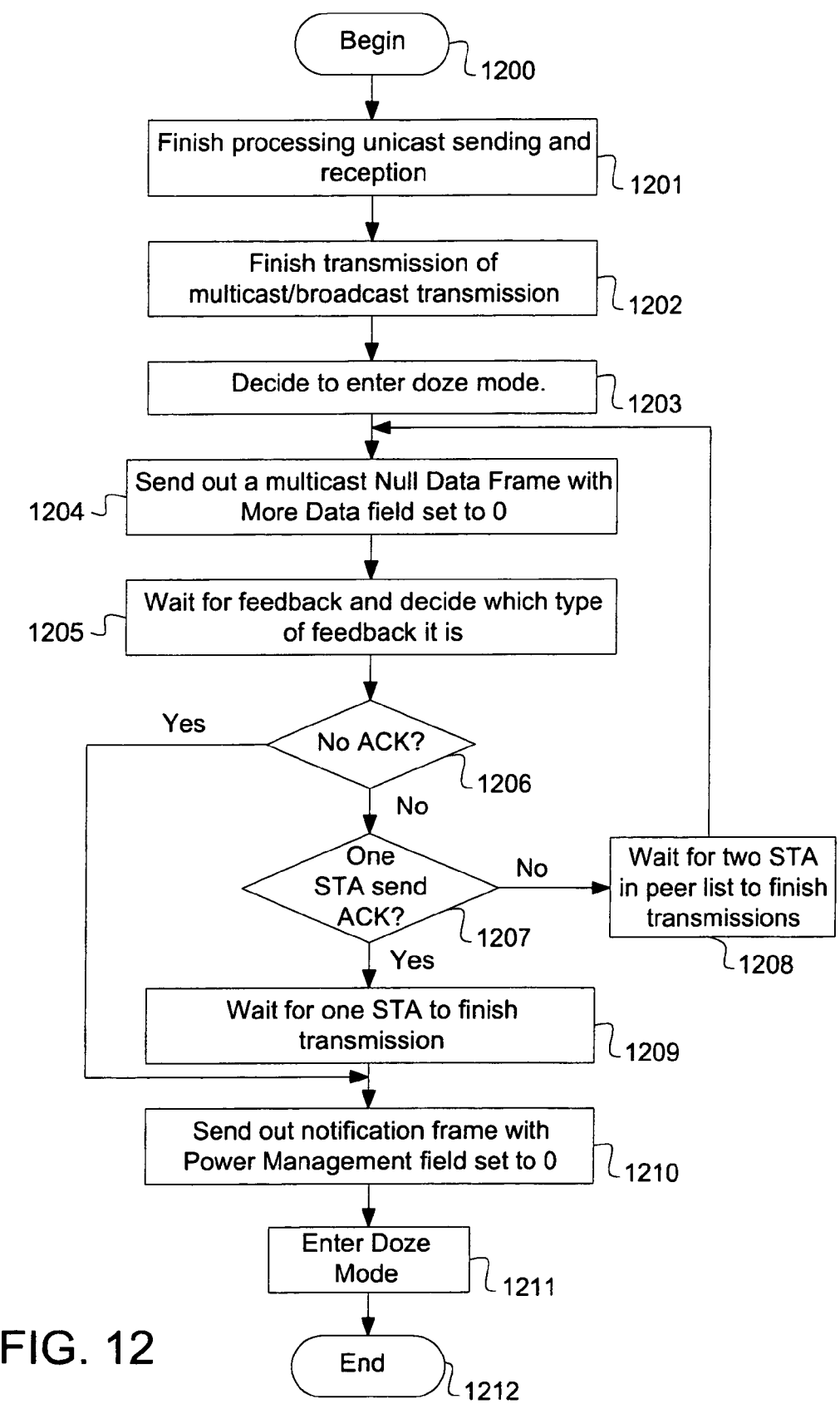
FIG. 12 shows one method for a multicast or broadcast sender STA to enter a doze mode, using an ACK frame collision detection technique, in accordance with one embodiment of the present invention.

In another approach, the sender STA may wait to enter the doze state until after it has received all the data frames to be sent by its receivers. This second approach requires that the multicast or broadcast sender STA has correct state information of all of its receivers to successfully enter a doze mode. FIG. 12 shows one method under this second approach for a multicast or broadcast sender STA to enter a doze mode. As shown in FIG. 12, the sender STA completes both its unicast sending and reception (step 1201) and multicast transmission (step 1202), setting the "more data" field to '1' in the data frames if it has more data to send, and setting the "more data" field to '0', at the final data frame. Multicast or broadcast frames are not acknowledged.

Upon completing the activities of steps 1201 and 1202, the sender STA may decide to enter a doze mode (step 1203). To prepare to enter the doze mode, the sender STA first sends out a multicast null data frame to all its neighbors (step 1204). The multicast null data frame is intended to solicit response (in the form of ACK frames) from the receiver STAs that have data frames to send to the sender (step 1205). Upon receiving the multicast or broadcast null data frame from the sender, a receiver STA that still has data to send to the sender STA sends an ACK frame to the sender STA after SIFS time, setting the "more data" field of the ACK frame to '1'. Using the process discussed below in conjunction with FIG. 11, the sender STA is able to determine if there is (1) no ACK frame (step 1206), (2) exactly one ACK frame (step 1207), or (3) multiple ACK frames (step 1208, in the form of an ACK frame collision). The sender STA enters the doze mode if there is No ACK frame (i.e., none of the receiver STAs has a data frame to send to the sender STA).

If there is exactly one ACK frame, the sender STA waits for the data frames from the sender STA of the ACK frame (step 1209). The transmission between the multicast or broadcast sender STA and its receiver STA may complete using a protocol discussed above, for example. Thereafter, the multicast or broadcast sender may enter the doze mode. The multicast or broadcast sender STA may send out a notification frame in which a "power management" field in an appropriate header is set to indicate that the sender STA is going into a power-saving mode (step 1210).

In the case of an ACK collision (i.e., step 1208, corresponding to two or more receiver STAs having data to send the multicast or broadcast sender STA), the sender STA waits for at least two STAs to finish their data frame transmissions to the sender STA. Thereafter, the sender STA resends the multicast null data frame, repeating steps 1204-1208.

Figure 11:
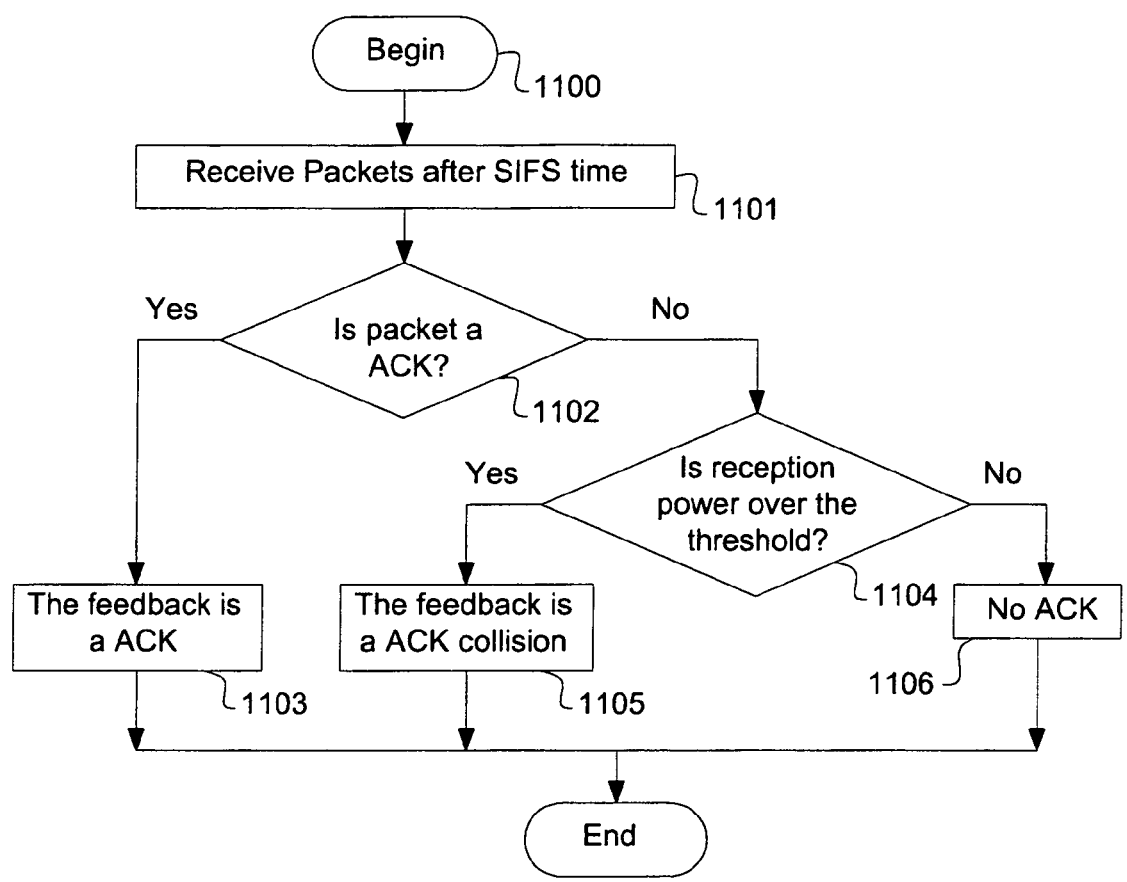
FIG. 11 is a flow chart that illustrates how a multicast sender STA may determine the ACK frame received in response to a multicast notification frame.

To make the determinations of steps 1206-1208 requires the multicast or broadcast sender STA to differentiate the collision of ACK frames from no ACK frame transmission. To do so, the sender STA measures whether or not the transmission power exceeds a threshold within an ACK transmission period that begins after a SIFS time from the time the multicast null data frame completes transmission. FIG. 11 is a flow chart that illustrates how a multicast sender STA may determine the ACK frame received in response to a multicast notification frame. As shown in FIG. 11, the multicast or broadcast sender STA first determines if a proper ACK frame is received during the ACK transmission period (step 1101-1103). If not (step 1104), the sender STA determines whether the received signal power exceeds a pre-determined average noise power threshold. If a higher power than the noise power threshold is received (step 1105), the sender STA considers an ACK collision as being detected. Otherwise (step 1106, i.e., a lower power than the noise power threshold is received), the sender STA considers that as having no ACK frame received.

Figure 13:
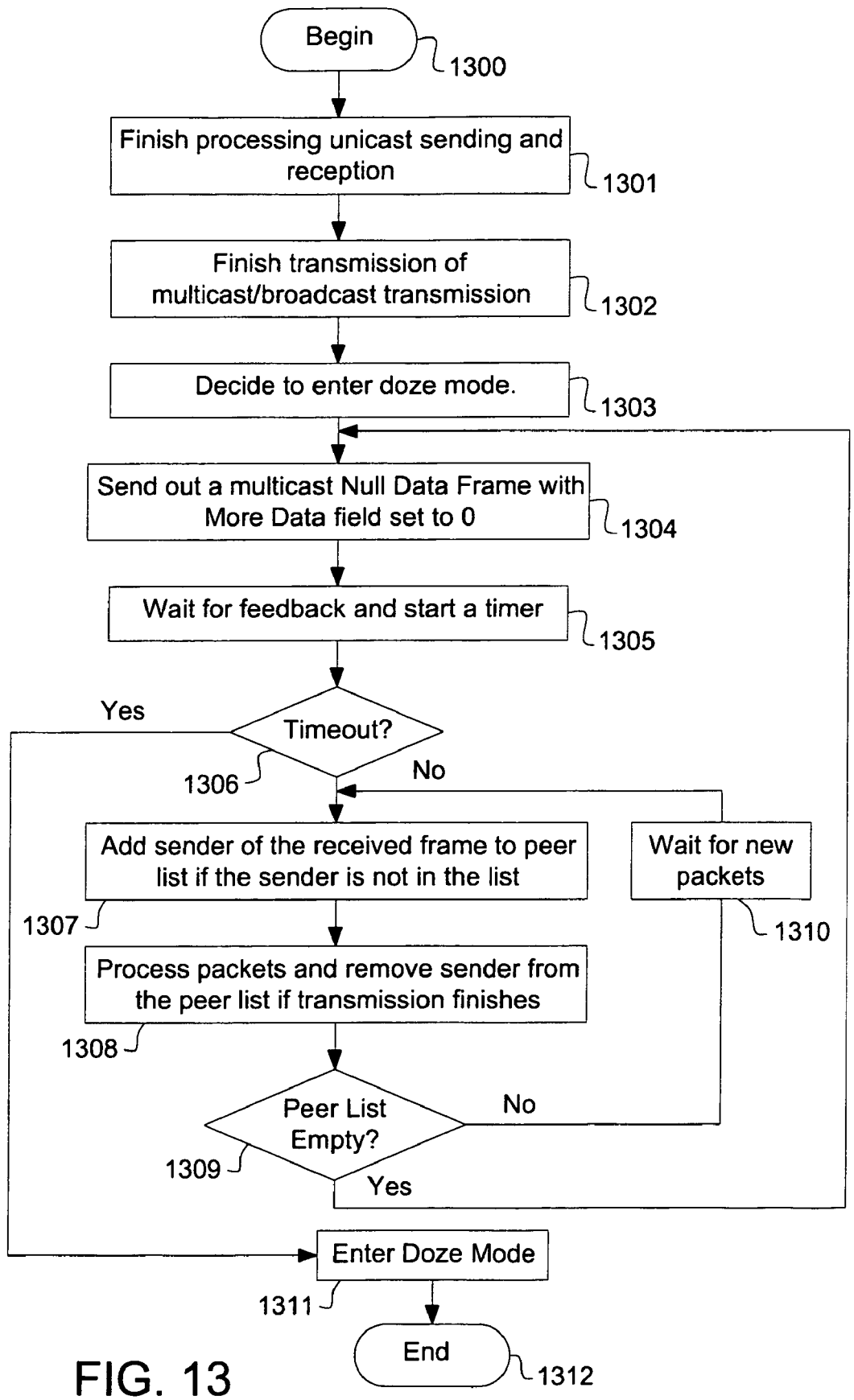
FIG. 13 shows a process by which a multicast or broadcast sender STA enters a doze mode, using a timer to determine if there is data to be received from other STAs, in accordance with one embodiment of the present invention.
Figure 16:
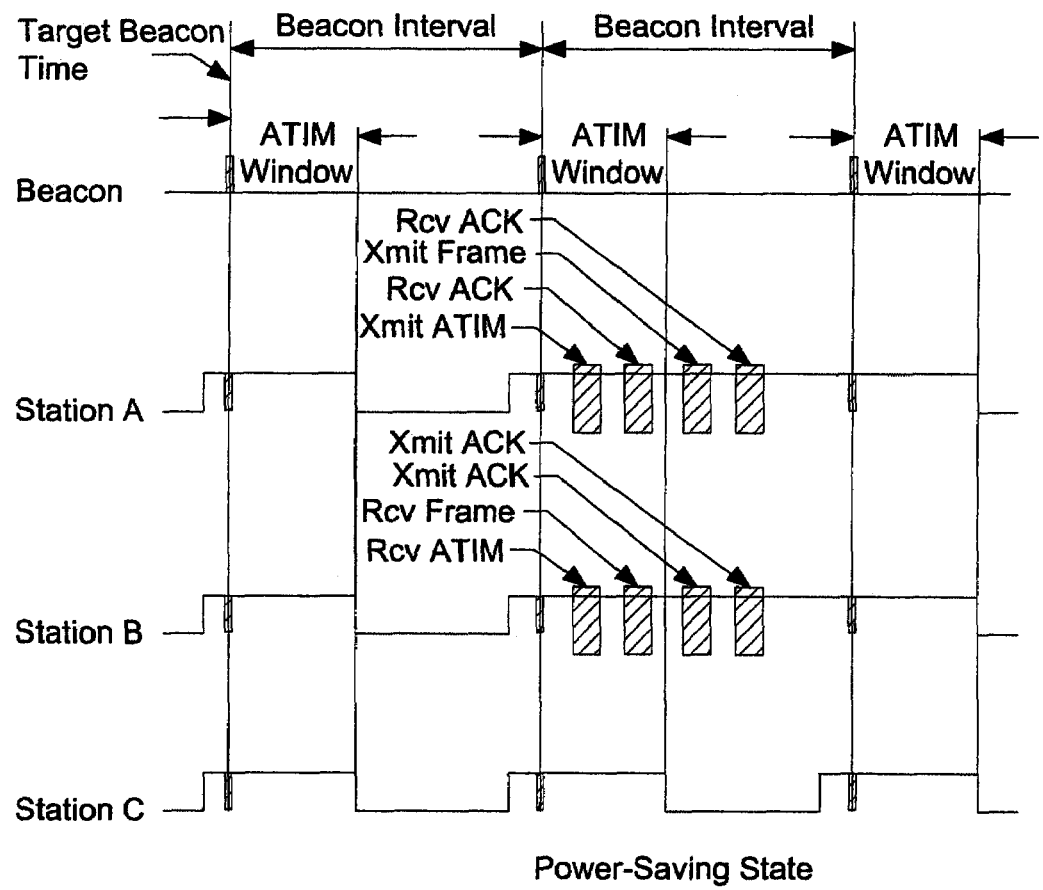
FIG. 16 shows the basic operations of power management in an IBSS.

In an alternative approach, the multicast null data frame is not acknowledged. FIG. 13 shows a process under this alternative approach by which a multicast or broadcast sender STA enters a doze mode. As shown in FIG. 13, after completing the unicast sending and receiving activities (step 1301) and multicast or broadcast transmission (step 1302), the multicast or broadcast sender STA decides to enter a doze mode (step 1303), similar to those activities described above in conjunction with steps 1201-1203 of FIG. 12. The multicast or broadcast sender then sends a multicast null data frame with the "more data" field set to '1', and initiates a timer (steps 1304, 1305). In this embodiment, when a receiver STA that has data frames to be transmitted to the multicast or broadcast sender receives the null data frame, the receiver advances the data frames for the multicast or broadcast sender ahead of other data frames the receiver intends to send. Thus, when such a receiver STA next seizes the channel for packet transmission, a data frame destined to the multicast sender STA is sent.

If no data frames are received before the timer expires (step 1306), the multicast sender STA enters the doze mode (step 1311). However, if a data frame arrives, the multicast sender STA then includes the sending STA into its peer list (step 1307), if it is not already on the peer list. The multicast sender STA and this sending STA may exchange data transmission traffic information using the processes discussed above (e.g., processes illustrated in FIGS. 9 and 10). Additional data frames from other STAs may also arrive prior to this exchange between the multicast sender and the sending STA completes.

The multicast sender STA includes these additional STAs to its peer list as the data frames arrive. At the same time, the multicast sender removes STAs that have finished transmission from the peer list (step 1308). This process continues as the receiver STAs complete their transmissions to the multicast or broadcast sender. When the peer list is empty (step 1309), the multicast sender then sends out another null data frame again to determine if it can enter the doze mode. Steps 1304-1310 are repeated until either the sender enters the doze mode at step 1311, or a new beacon interval begins.

In yet another embodiment, every STA in an ad hoc wireless network operates in the promiscuous mode during the ATIM window, whereby every STA listens to the ATIM/ACK exchanges among the other STAs. Therefore, even though an STA does not have an ATIM/ACK exchange with any or all of its neighbors, the STA may still derive the power-saving modes of its neighbors by observation. With this knowledge of the neighbors power-saving states, the STA may send out frames to any of its neighbors believed to be in an awake mode. To enter a doze mode, an STA determines whether or not its neighbors may send it data packets. In such an embodiment, the method's of FIGS. 6-13 are possible. For example, an STA may use the methods of FIGS. 6-10 to exchange information with other STAs that it has exchanged ATIM/ACK frames during the ATIM window. When the STA has sent out multicast or broadcast data frames, the methods of FIGS. 11-13 may be used. Thus, when the STA desires to enter a doze mode, in one instance, it may enter the doze mode after its data transmissions and completing the traffic announced in the ATIM window, without query of its neighbors for possible data frames. In another instance, the STA may send a broadcast null data frame with a power management field set to '0' to notify its neighboring STAs that it intends to enter a doze mode. The neighboring STAs may respond using the methods of FIG. 11-13, for example.

The detailed description above is provided to illustrate the specific embodiments of the present invention and is not intended to be limiting. Various modifications and variations within the scope of the present invention are possible. The present invention is set forth within the scopes of the following claims.

We claim:

1. A method for a sender station in an ad hoc wireless network to enter a power-saving state, comprising:
   maintaining a first list of receiver stations within the ad hoc wireless network, comprising receiver stations from which the sender station has received acknowledgement frames to control frames sent by the sender station indicating data frames to be sent within the current beacon interval;
   maintaining a second list of receiver stations within the ad hoc wireless network, comprising receiver stations from which the sender station has failed to receive acknowledgement frames to control frames sent by the sender station indicating data frames to be sent within the current beacon interval;
   sending the data frames to each receiver station on both the first and the second lists; and
   entering the power-saving state.

2. A method as in claim 1, further comprising moving a receiver station from the second list to the first list when a data frame is transmitted successfully to the receiver station.

3. A method as in claim 2, wherein the sender station indicates to each receiver station completion of transmission to that receiver station by indicating, in a selected field in a header of a data frame, whether or not the sender station has additional data to send.

4. A method as in claim 3, wherein the sender station examines an acknowledgement frame responding to the data frame to determine whether or not the receiver station has data frames for the sender station.

5. A method as in claim 4, wherein the sender station further maintains a peer list of receiver stations and wherein the sender stations adds the receiver station to the peer list when the sender station determines from the acknowledgement frame that the receiver station has data frames for the sender station.

6. A method as in claim 5, wherein the receiver station is removed from the peer list when transmission from the receiver station is complete.

7. A method as in claim 6, wherein the sender station enters the power-saving state when the peer list becomes empty.

8. A method for a sender station of a multicast frame in an ad hoc wireless network to enter a power-saving state, comprising:
   completing unicast data transmission previously announced in an ATIM window between the sender station and other stations of the ad hoc wireless network;
   completing multicast transmissions by the sender station;
   sending a multicast null data frame in which a selected field in a header of the multicast null data frame indicates whether or not the sender station has additional data to send; and
   entering the power-saving state.

9. A method as in claim 8, further comprising examining responses from the other stations to determine if the other stations have data frames to send to the sender station.

10. A method as in claim 9, wherein the examining comprises determining whether none, one, or more than one station responded to the multicast null data frame.

11. A method as in claim 10, further comprising receiving data frames from the station or stations that responded to the multicast null data frame.

12. A method as in claim 11, further comprising sending out a notification frame indicating transition into the power-saving state upon receiving all data frames from the station or stations that responded to the multicast null data frame.

13. A method as in claim 10 wherein, upon receiving data frames from two stations, resending the multicast null data frame.

14. A method as in claim 8, further comprising setting a timer and entering the power-saving state when the timer expires without receiving a control or data frame indicating one or more of the other stations have data frames to transmit to the sender station.

15. A method as in claim 14 wherein, upon receiving a control or data frame from one of the other stations indicating that that station has data frames to be transmitted to the sender station, the sender station includes that station to a peer list, and removes that station from the peer list when the data frames are received from that station.

16. A method as in claim 15, wherein the sender station enters the power-saving state when the peer list becomes empty.

17. A method as in claim 8, wherein the sender station operates in promiscuous mode during the ATIM window.

* * * * *

UNITED STATES PATENT AND TRADEMARK OFFICE
CERTIFICATE OF CORRECTION

PATENT NO. : 7,656,831 B2  Page 1 of 1
APPLICATION NO. : 11/454259
DATED : February 2, 2010
INVENTOR(S) : Gao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 335 days.

Signed and Sealed this

Thirtieth Day of November, 2010

David J. Kappos
*Director of the United States Patent and Trademark Office*